United States Patent [19]

McGrath et al.

[11] Patent Number: 5,098,959
[45] Date of Patent: Mar. 24, 1992

[54] BLOCK POLYMERS OF METHACRYLATES

[75] Inventors: James E. McGrath; Craig D. DePorter, both of Blacksburg, Va.; Timothy E. Long, Rochester, N.Y.

[73] Assignee: The Dow Chemical Company, Midland, Mich.

[21] Appl. No.: 560,266

[22] Filed: Jul. 30, 1990

Related U.S. Application Data

[63] Continuation of Ser. No. 172,040, Mar. 23, 1988, abandoned.

[51] Int. Cl.$^5$ ............... C08F 293/00; C08F 265/02
[52] U.S. Cl. ............................. 525/299; 525/301; 525/309
[58] Field of Search ............... 525/298, 299, 309, 271, 525/301

[56] References Cited

U.S. PATENT DOCUMENTS

| | | | |
|---|---|---|---|
| 3,287,298 | 11/1966 | D'Aleliu | 525/309 |
| 3,309,423 | 3/1967 | D'Aleliu | 525/271 |
| 3,699,191 | 10/1972 | Niemann | 525/309 |
| 4,113,917 | 9/1978 | Tugukuni et al. | 525/309 |

OTHER PUBLICATIONS

Polymer Preprints 28(1) Apr. 1987, pp. 384–386.
Polymer Preprints 28(2) Aug. 1987, pp. 214–216.
Polymer Preprints, 26(1), Apr. 1985, pp. 247–248.
R. D. Allen, et al., Coulombic Interactions in Macromolecular Systems, ACS Symposium Series #302, pp. 79–92 (1986).
Polymer Preprints 27(2) 258–260 (1986).
Polymer Preprints 24(2) 41–43 (1983).

Primary Examiner—Melvyn I. Marquis
Assistant Examiner—Ralph Dean, Jr.

[57] ABSTRACT

Novel methacrylate ester block polymers comprising both a hydrolyzable and a non-hydrolyzable ester functionality are capable of being partially hydrolyzed and neutralized to yield the corresponding methacrylic acid and methacrylic acid salt (ionomer) derivatives. The compositions are usefully employed in the preparation of thermoplastic elastomers, adhesives and laminating films.

2 Claims, No Drawings

BLOCK POLYMERS OF METHACRYLATES

CROSS-REFERENCE TO RELATED APPLICATION

This is a continuation of application Ser. No. 172,040, filed Mar. 23, 1988, now abandoned.

BACKGROUND OF THE INVENTION

The present invention relates to block polymers comprising methacrylic acid and derivatives of methacrylic acid as well as a method for the preparation of such block polymers. In the past, carboxylic acid containing polymers have been typically synthesized by the direct free radical polymerization of various carboxylic acids, as well as ester, or anhydride derivatives thereof with various vinyl comonomers. The corresponding carboxylic salt derivatives or ionomers are typically prepared by partial or complete neutralization of carboxylic acid groups with various basic compounds. Previously known synthetic routes have resulted in the random placement of such acid or ionic groups along polymer backbones. It would be desirable to provide similar polymeric structures having controlled composition and architecture, predictable molecular weights and narrow molecular weight distributions.

In pending application Ser. No 70,269, filed July 6, 1987, two of the present coinventors and one other disclosed and claimed block copolymers of a diene and methacrylic acid and derivatives of such block copolymers.

It is previously known to use anionic polymerization techniques for the preparation of block polymers having controlled morphology and composition as well as architecture and predictable molecular weights, as well as narrow molecular weight distributions.

Moreover, it is previously known that tertiary butyl methacrylate may be polymerized by anionic techniques. All methacrylate block copolymers of methyl methacrylate/ethyl methacrylate, methyl methacrylate/n-butyl methacrylate and methyl methacrylate/t-butyl methacrylate were disclosed in Polymer Preprints 26(1) 1985, pg. 247–248.

SUMMARY OF THE INVENTION

According to the present invention, there are now provided novel block polymers comprising, in polymerized form, one or more non-hydrolyzable methacrylate esters of up to 20 carbons in the ester group and one or more monomers selected from the group consisting of hydrolyzable esters of methacrylic acid having from 2 to 7 carbons in the ester group, methacrylic acid and salts of methacrylic acid.

In a preferred embodiment these block polymers correspond to the formula AB$+$(BA)$_n$(I) or BA$+$(AB)$_n$ (II) wherein:

A is a homopolymer or copolymer comprising, in polymerized form, one or more monomers selected from the group consisting of hydrolyzable esters of methacrylic acid having from 2 to 7 carbons in the ester group, methacrylic acid and salts of methacrylic acid; a copolymer of more than one such hydrolyzable ester of methacrylic acid, methacrylic acid or a salt thereof; or a block or random copolymer of one or more hydrolyzable esters of methacrylic acid, methacrylic acid or salts thereof with one or more copolymerizable comonomers.

B is a homopolymer comprising, in polymerized form, a non-hydrolyzable methacrylate ester having from 6 to 20 carbons in the ester group; a copolymer comprising more than one such methacrylate ester; or a block or random copolymer of one or more of the foregoing non-hydrolyzable methacrylate esters with one or more copolymerizable comonomers, and n is a number from 0 to 6.

DETAILED DESCRIPTION OF THE INVENTION

Anionic polymerization techniques are well known and previously disclosed in the art. See, for example, M. Morton, "Anionic Polymerization Principles and Practice", Academic Press (1983). Briefly, a living anion is prepared by use of a reactive anionic polymerization initiator. Suitable initiators include the well known metals such as sodium and lithium as well as the more preferred organo metal compounds particularly lithium compounds. A particularly preferred monofunctional anionic initiator is 1,1-diphenyl-3-methylpentyl lithium. Preferred difunctional anionic initiators include those compositions disclosed in U.S. Pat. Nos. 4,172,190; 4,196,154; 4,172,100; 4,182,818; 4,196,153; 4,200,718; 4,205,016; 4,201,729; and 3,663,634 the teachings of which are incorporated herein by references thereto.

The polymers of the present invention may be prepared according to any suitable technique. Simple repeating diblock and triblock copolymers may be prepared by sequential addition of the respective monomers. Suitably, a monofunctional organometallic anionic polymerization initiator may be contacted with the monomer or monomers comprising block A of Formula I (or block B of Formula II) under anionic polymerization conditions. The polymerization is continued and the monomer or monomers comprising the remaining blocks are polymerized. Symmetrical multiblock polymers may be produced by contacting the living polymer anion with a coupling agent of functionality n+1.

An alternative technique for preparing such symmetrical multiblock polymers utilizes a multifunctional organometallic anionic polymerization initiator of functionality n+1. The monomer or monomers for block B (for formula I polymers) or for block A (for formula II polymers) are contacted with the polymerization initiator under anionic polymerization conditions, and after complete polymerization, the remaining monomers are added to the reactor and polymerized. If vinylaromatic or diene monomers are employed in the invention, their polymerization must precede the polymerization of any esters of methacrylic acid.

By later applied conventional techniques, the hydrolyzable ester functionality of the block polymer may be altered to yield acid or neutral salt derivatives having an ordered placement of functional groups.

A central discovery according to the present invention is the fact that certain methacrylate esters form desirable block copolymers which surprisingly are relatively stable under standard acid catalyzed hydrolysis reactions. The resulting polymers are also preferably relatively rubbery thereby making the products well adapted for use in elastomeric or adhesive applications. Thus, one of the methacrylate ester moieties initially present in the polymers of the present invention may be hydrolyzed to form the corresponding acid functionality and further treated to form additional derivatives without at the same time substantially affecting the non-hydrolyzable methacrylate ester functionality. Because the methacrylic polymer blocks are highly saturated, the products of the invention in a preferred embodiment are highly resistant to environmental degradation due to ultraviolet light.

As used herein, the term "non-hydrolyzable" refers to the fact that one methacrylate ester functionality of the polymers is not substantially hydrolyzed under conditions leading to substantial hydrolysis of other methacrylate ester functionality in the same polymer. That is, greater than 50 mole % of one methacrylate ester functionality should remain under conditions wherein greater than 50 mole % of another methacrylate ester functionality in the polymer is hydrolyzed. Preferably, greater than 75% of one methacrylate ester functionality is hydrolyzed. Most preferably, substantially all of one methacrylate ester functionality is unhydrolyzed while substantially all of another methacrylate ester functionality in the same polymer is hydrolyzed.

As the non-hydrolyzable methacrylate ester, either aryl or alkyl esters of from 6 to 20 carbons are preferred, a most preferred non-hydrolyzed methacrylate ester is 2-ethylhexylmethacrylate. The block polymers of the invention may be in the form of diblock-, triblock-, or star block polymers and may have standard, random, or tapered geometry. Those block polymers possessing elastomeric properties preferably have glass transition temperatures less than about 25° C., most preferably less than about 0° C.

The block polymers of the present invention may be prepared utilizing conventional anionic polymerization conditions and initiators. Certain of the monomers are preferably reacted at temperatures from −100° to −10° C. However, certain of the hydrolyzable methacrylate esters, especially the t-alkyl methacrylates, may be reacted at temperatures up to about 35° C. or even higher. In the first step, a living polymer anion is prepared by anionic polymerization techniques and retained in solution for use in the next step. Suitably, this polymer is comprised of either the non-hydrolyzable methacrylate or the hydrolyzable methacrylate. The initial polymerization is preferably conducted in a solvent, particularly an inert, aprotic, organic liquid such as toluene, hexane, tetrahydrofuran, etc. A preferred solvent is tetrahydrofuran.

Next, the living polymer anion is contacted with the remaining methacrylate ester monomer under anionic polymerization conditions so as to prepare a second polymer block. The resulting block polymer must comprise at least one block of a non-hydrolyzable methacrylate ester and one block of a hydrolyzable methacrylate ester.

Additional copolymerizable monomers may be included in the polymerization process if desired in order to modify the resulting block copolymer properties. The copolymerizable monomers may be incorporated as separate blocks or added concurrently to the polymerization, resulting in the formation of tapered block copolymers. Suitable copolymerizable monomers include monovinylidene aromatic monomers such as styrene, c-methylstyrene, t-butyl styrene, etc.; acrylonitrile: N,N-dialkyl acrylamides: conjugated dienes: reactive coupling agents such as divinyl benzene, ethylene glycol dimethacrylate; etc. Certain of the foregoing monomers may be employed to modify specific polymer properties. For example, t-butyl styrene containing polymers possess enhanced solubility in aliphatic solvents such as hexane. However, because the basicity of the living anion is affected by the addition of methacrylate functionality, the above described additional copolymerizable monomers are generally incorporated into the polymer prior to polymerization of either the hydrolyzable methacrylate or the non-hydrolyzable methacrylate. In addition, it may be desirable to employ a protecting group such as 1,1-diphenylethylene in order to prevent reaction of such functionality with the carbonyl functionality of later added methacrylate monomers. For the foregoing reasons, preferred polymers according to the invention comprise only hydrolyzable methacrylate ester moieties or derivatives thereof and non-hydrolyzable methacrylate ester moieties.

The addition of the methacrylate esters to the living anion has been found to be beneficially advanced by the addition to the reaction mixture of a polar, dry, aprotic organic compound in a quantity sufficient to modify the polymerization rate of the reaction. Suitable polar, aprotic, organic compounds are exemplified by the cyclic ethers, particularly tetrahydrofuran. Preferably, the polar, aprotic, organic compound is employed in an amount from about 0.5 to about 90 weight percent, most preferably from about 25 to about 75 weight percent based on total solvent weight.

After complete polymerization of the various monomers, the living polymer is terminated by any suitable technique. Recovery and work up are easily performed utilizing previously disclosed techniques such as precipitation and devolatilization.

To produce the highly desired methacrylic acid containing block polymers of the invention, the hydrolyzable methacrylate ester functionality of the initially prepared block polymers is hydrolyzed. As an aid in such hydrolysis, it is desirable that the hydrolyzable methacrylate ester be selected to provide ease of operating conditions and good selectivity to the methacrylic acid derivative upon hydrolysis. Thus, preferred hydrolyzable methyl acrylate esters are those capable of addition under anionic polymerization conditions to a living anion, preferably at a temperature from about 0° C. to about 35° C., and capable of removal under non-aqueous hydrolysis reaction conditions. Preferred hydrolyzable methacrylate esters for use in the present invention are the tertiary alkyl methacrylates due to the previously mentioned ability to employ such monomers at polymerization temperatures on the order of 0° C. to about 35° C. The use of such elevated reaction temperatures is believed to be due to the stability of the t-alkyl methacrylate enolate anion at such temperatures.

Suitably, the hydrolysis is conducted by heating the resulting polymer containing hydrolyzable methacrylate ester groups, optionally in the presence of a catalytic amount of an acid. Such heating results in alkyloxygen cleavage and the release of relatively volatile aliphatic reaction products and the formation of the desired methacrylic acid functionalized block polymers. Suitable acids for the above hydrolysis include the aromatic sulfonic acids, especially toluene sulfonic acid. It is understood that hydrolysis of only a portion of the ester functionality may be obtained according to the present method if desired. Preferred temperatures on the order of about 50° to 150° C. are employed. A suitable solvent selected to maintain solubility of the polymer may be employed to lead to higher degrees of hydrolysis. Examples of suitable solvents for the hydrolysis include toluene, xylene, chlorobenzene, etc., for use particularly where the amount of an incorporated hydrolyzable methacrylate ester functionality is less than about 10 percent by weight. Block polymers containing additional amounts of hydrolyzable methacrylate ester functionality are preferably maintained in solution by the use of more polar solvents such as, for example, alcohols. In a desirable embodiment, the hydrolysis reaction is conducted quantitatively in order to be able to more accurately control the final acid or ion content of the block polymer.

In addition to the catalytic acid hydrolysis, the methacrylate ester functionality may also be hydrolyzed by the use of an alkali metal superperoxide such as potassium superperoxide in a suitable solvent such as a mixture of dimethyl sulfoxide and tetrahydrofuran. This technique has been taught for example by R. D. Allen, et al., Coulombic Interactions in Macromolecular Systems, A.C.S. Symposium Series, #302, pg. 79-92 (1986). The resulting hydrolyzed product may be acidified with small amounts of an acid such as hydrogen chloride to improve solubility. Due to the difficulty in handling such reagents, the latter method is not preferred for commercial use.

Because 4-7 carbon membered alkenes which are the alkenes resulting from hydrolysis of tertiary butyl-, or 2-methyl-2-butyl-, and other 4-7 carbon tertiary alkyl methacrylate esters are easily volatilized, these compounds are the preferred tertiary alkyl methacrylate esters for use in the present invention. A highly preferred hydrolyzable, tertiary alkyl methacrylate is t-butyl methacrylate.

Where desired, the acid functionality of the methacrylic acid containing block polymers may be neutralized by contacting with a suitable basic reagent. Examples include ammonium and metal hydroxides particularly the alkali metal hydroxides. Particularly desirable metal salts of methacrylic acid include sodium, potassium, aluminum, tin, zinc, or nickel salts. By such techniques, ionomeric block copolymers containing methacrylic acid salt moieties are prepared.

Although any desired amount of neutralization of the acid functionality may be employed, in a preferred embodiment from about 1 to about 75 percent by weight of the functional moieties of the block polymer are the neutral salts thereof. In other respects, the neutralization process to produce ionomeric functionality in the resulting block polymers is as previously known in the art.

Having described the invention, the following examples are provided as further illustrative and are not to be construed as limiting.

EXAMPLES 1-6

Block copolymers (1A, a diblock utilizing 1,1-diphenyl-3-methylhexyl lithium initiator and 1B a triblock using 1,4-dilithio-1,1,4,4-tetraphenyl butane initiator) comprising t-butyl methacrylate and 2-ethylhexylmethacrylate in the amounts indicated in Table I were prepared and characterized. A portion of each was then subjected to hydrolysis to yield the corresponding block copolymers (2A, 2B) containing 2-ethylhexylmethacrylate and methacrylic acid moieties. Potassium containing block ionomers (3A, 3B) were subsequently prepared by neutralization of a portion of the block copolymers (2A and 2B) with potassium hydroxide.

Materials t-Butyl methacrylate was obtained from Rohm-Tech, and 2-ethylhexylmethacrylate was obtained from Polysciences Inc. Both monomers were stirred over finely ground calcium hydride for 2-3 days, followed by distillation under reduced pressure. The monomers were then transferred to a clean, dry bottle via a double ended needle and stored at $-20°$ C. under a nitrogen atmosphere. Immediately before use, the monomers were distilled under reduced pressure from a trialkyl aluminum or dialkyl aluminum hydride complex. In some cases, the final purification of the monomer was accomplished by complexing the calcium hydride purified monomer with the aluminum compound in one vessel, and then passing this solution through a column of activated basic alumina (Fisher). The clear effluent was then degassed under reduced pressure or under a nitrogen purge. The trialkyl aluminums and dialkyl aluminum hydrides were obtained from the Ethyl Corporation as 25 weight percent solutions in hexane. t-butyl lithium was obtained from the Lithco Division of FMC as a solution in cyclohexane (1.4M). The polymerization solvent was tetrahydrofuran (THF) (Fisher certified grade) which was distilled under dry nitrogen immediately before use from the purple sodium/benzophenone ketyl.

Difunctional Initiator Formation

The difunctional initiator that was employed was 1,4-dilithio-1,1,4,4-tetraphenylbutane which was prepared in a 250-ml one-necked round-bottomed flask equipped with a glass-encased magnetic stirring bar, and a rubber septum wired on with copper wire for a tight seal. The flask had been flamed with a nitrogen purge and was kept under an atmosphere of 6-8 psi dry nitrogen A four-fold molar excess of lithium wire (alpha Inorganics, Ventron) was placed quickly into the flask and a new septum wired on. The reaction flask was again flamed under a dry nitrogen purge, and kept under 6-8 psi nitrogen until cool. The solvent (THF) was then transferred to the flask via a double ended needle. The solvent was then degassed with a nitrogen purge and a calculated volume of 1,1-diphenyl ethylene was syringed into the reaction vessel. The reaction mixture was stirred under a 6-8 psi nitrogen atmosphere at room temperature for about 5 hours. The bright red initiator solution was removed by syringe.

Polymerization

The polymerization procedure for the preparation of block polymer IA was by the sequential addition technique utilizing the monofunctional initiator, 1,1-diphenyl-3-methylpentyl lithium (DMPL), prepared by reacting 1,2-diphenyl ethylene with t-butyl lithium in hexane solvent. t-Butyl methacrylate was reacted first.

The procedure using the difunctional initiator was very similar. The solution of initiator was added dropwise until the red color of the initiator was stabilized, indicating that final impurities in the polymerization reactors were titrated, then the calculated volume of initiator was charged. The monomers were then added dropwise to the initiator solution, with the center block being polymerized first.

All polymerizations were conducted in tetrahydrofuran solvent at $-78°$ C. Polymerization of each block was conducted for 20 minutes. The polymerizations were then terminated with degassed methanol and the polymers precipitated in methanol/water (80/20) and dried in vacuo overnight at ca. $60°$ C. Amounts of the various monomers employed and the resulting polymer compositions are listed in Table I.

TABLE I

| Ex | Type | EHMA[1] (g) | TBMA[2] (g) | Wt. ratio[3] | Mn × $(10^{-3})$[4] |
|---|---|---|---|---|---|
| 1 | 1A | 14.1 | 0.45 | 3/97 | — |
| 2 | 1B | 14.4 | 0.6 | 2/96/2 | 136 |
| 3 | 1B | 13.8 | 1.2 | 4/92/4 | 149 |
| 4 | 1B | 13.2 | 1.8 | 6/88/6 | 187 |
| 5 | 1B | 12.6 | 2.4 | 8/84/8 | 128 |
| 6 | 1B | 12.0 | 3.0 | 10/80/10 | 168 |

[1] 2-ethylhexyl methacrylate
[2] t-butyl methacrylate
[3] weight ratio TBMA/EHMA or TBMA/EHMA/TBMA
[4] number average molecular weight

EXAMPLE 7

A triblock polymer was made by sequential polymerization using DMPL initiator to polymerize 0.45 g tert-butylmethacrylate first then 14.10 g 2-ethylhexylmethacrylate. Instead of terminating the diblock polymer, 0.45 g more tert-butylmethacrylate was added to make a 3/94/3 TBMA/EHMA/TMBA composition. The number average molecular weight as determined by GPC using polystyrene calibration was 113,700.

Hydrolysis

EXAMPLES 8-13

The poly(t-butyl methacrylate) containing block polymers of Examples 1-6 were hydrolyzed with acid catalysis at mild temperatures (80° C.). Typically, 5-10 weight percent (based on t-butyl ester content) of p-toluene sulfonic acid was used. The block polymers were dissolved in toluene (Fisher, certified grade) at ca. 5% solids with the acid and heated to 80° for 8 hours. A slow nitrogen purge through the headspace helped facilitate the removal of the volatile isobutylene product of the hydrolysis. After hydrolysis, the polymers were precipitated in cold methanol (−78° C.) and dried in vacuo overnight at 100° C. The resulting block copolymers were 2A, 2-ethylhexylmethacrylate/methacrylic acid block copolymer, Example 8, and 2B, methacrylic acid/2-ethylhexylmethacrylate/methacrylic acid block copolymer, Examples 9-13.

Neutralization

EXAMPLES 14-19

The block-ionomers were formed by neutralization of the acid-containing polymers of Examples 8-14 with methanolic potassium hydroxide (KOH, Fisher certified, 0.1N). The acid polymers were dissolved in THF at ca. 5% solids and titrated at ambient temperature and atmosphere to a phenolphthalein endpoint. To avoid the possibility of indicator contamination in the polymers that were to be tested, a known amount of the acid containing polymer was titrated to a phenolphthalein endpoint, and the volume of base required to titrate a larger amount of the polymer was based on that titration. The ionomers were then precipitated in methanol (−78° C.), or films were cast directly from the neutralization solvent after filtration and dried in vacuo overnight at 100° C. The resulting block copolymers were 3A, 2-ethylhexyl methacrylate/—CH—C(CH$_3$)-(COO—K+)—ionomer block copolymer, Example 14, and 3B, —CH—C(CH$_3$)(COO—K+)—/2-ethylhexyl methacylate/CH—C(CH$_3$)(COO—K+)—ionomer block copolymer, Examples 15-19.

Characterization

Molecular weight and molecular weight distributions of the precursors and acid-containing polymers were determined by gel permeation chromatography (GPC). A Waters 590 GPC equipped with columns of 500 Angstroms, $10^3$ Angstroms, $10^4$ Angstroms, $10^5$ Angstroms was utilized. Both poly(methyl methacrylate) and polystyrene standards (Polymer Laboratories) were used in these characterizations.

Fourier transform infrared spectroscopy (FTIR) was performed on a Nicolet MX-1 spectrometer. Nuclear magnetic resonance spectroscopy (NMR) was performed on a Bruker WP-270 high resolution spectrometer. The results confirmed the assigned identities of the polymers.

What is claimed is:

1. A block copolymer comprising, in polymerized form, one or more aryl or alkyl methacrylate esters having from 6 to 20 carbons in the ester group and one or more monomers selected from the group consisting of methacrylic acid and salts of methacrylic acid.

2. A block copolymer according to claim 1 comprising 2-ethylhexyl methacrylate.

* * * * *